US010013610B2

(12) United States Patent
Chen et al.

(10) Patent No.: US 10,013,610 B2
(45) Date of Patent: Jul. 3, 2018

(54) INTEGRATION OF POSITIONAL DATA AND OVERHEAD IMAGES FOR LANE IDENTIFICATION

(71) Applicant: Nokia Technologies Oy, Espoo (FI)

(72) Inventors: Xin Chen, Evanston, IL (US); Xinyu Huang, Cary, NC (US)

(73) Assignee: Nokia Technologies Oy, Espoo (FI)

( * ) Notice: Subject to any disclaimer, the term of this patent is extended or adjusted under 35 U.S.C. 154(b) by 173 days.

(21) Appl. No.: 14/921,500

(22) Filed: Oct. 23, 2015

(65) Prior Publication Data
US 2017/0116477 A1    Apr. 27, 2017

(51) Int. Cl.
G06K 9/00    (2006.01)
G06K 9/46    (2006.01)
G01C 21/00    (2006.01)
G06T 19/00    (2011.01)
G06T 7/246    (2017.01)

(52) U.S. Cl.
CPC ......... *G06K 9/00651* (2013.01); *G01C 21/00* (2013.01); *G06K 9/4638* (2013.01); *G06T 7/248* (2017.01); *G06T 19/003* (2013.01); *G06T 2207/10032* (2013.01); *G06T 2207/20024* (2013.01); *G06T 2207/30241* (2013.01); *G06T 2210/22* (2013.01)

(58) Field of Classification Search
None
See application file for complete search history.

(56) References Cited

U.S. PATENT DOCUMENTS

2012/0050489 A1* 3/2012 Gupta ............... G06K 9/00798
                                                   348/46
2013/0190981 A1* 7/2013 Dolinar .................. B60R 11/04
                                                   701/41

FOREIGN PATENT DOCUMENTS

EP        2597425 A1    5/2013
WO    2009064172 A1    5/2009

OTHER PUBLICATIONS

Cao, Chuqing, and Ying Sun. "Automatic road centerline extraction from imagery using road GPS data." Remote Sensing 6.9 (2014): 9014-9033.
Kamini, Sabu, and M. H. Nerkar. "Colour Vision Based Drivable Road Area Estimation." International Journal of Innovative Research and Development 4.5 (2015).
Liu, Yanbing, Jian Rong, and Ke Chen. "Extraction of lane markings based on steerable filters." International Symposium on Instrumentation Science and Technology. International Society for Optics and Photonics, 2008.
(Continued)

*Primary Examiner* — Weiwen Yang
(74) *Attorney, Agent, or Firm* — Lempia Summerfield Katz LLC

(57) ABSTRACT

A method and apparatus for lane detection using overhead images and positional data. A server receives positional data from a vehicle and computes a continuous trajectory. The server receives an overhead image of a road section. The server crops and processes the overhead image to remove unwanted portions. The server identifies edge features using the continuous trajectory and steerable filters. The server identifies lanes in the overhead image using a maximization algorithm, the edge filters, and the continuous trajectory.

18 Claims, 9 Drawing Sheets

(56) References Cited

OTHER PUBLICATIONS

Myung Hee Jo et al., "Developing satellite image based e-mapping system", Proceedings of 26th Asian Conference on Remote Sensing and 2nd Asian Space Conference, Nov. 7-11, 2005, 8 pages.

Pandit, Vinay. Automatic road extraction from high resolution satellite imagery. Diss. International Institute of Information Technology, Hyderabad, 2009.

Ponsa, Daniel, Joan Serrat, and Antonio M. López. "On-board image-based vehicle detection and tracking." Transactions of the Institute of Measurement and Control 33.7 (2011): 783-805.

Qiaoping Zhang, "Automated Road Network Extraction from High Spatial Resolution Multi-Spectral Imagery", Department of Geomatics Engineering, Apr. 2006, 156 pages, Calgary, Alberta.

Shang, Erke, et al. "Lane detection using steerable filters and FPGA-based implementation." Image and Graphics (ICIG), 2011 Sixth International Conference on Image and Graphics, IEEE, pp. 908-913, 2011.

* cited by examiner

INTEGRATION OF POSITIONAL DATA AND OVERHEAD IMAGES FOR LANE IDENTIFICATION

FIELD

The following disclosure relates to mapping, imagery, and vehicle navigation services.

BACKGROUND

Modern vehicles require accurate navigational systems. A vehicle may eliminate many dangerous unknowns by identifying exactly where the vehicle is on the road in real time, along with its immediate surroundings. A high definition (HD) map is a crucial component of assisted or automatic driving technology. Vehicles may include many sensors, but a HD map may be the most important tool vehicles use.

An HD map is needed not only to allow a vehicle to precisely position itself laterally and longitudinally, but to enable the car to maneuver correctly. While sensors in vehicles may detect objects out around 100 meters, a car traveling at 80 miles per hour only has a sensing horizon of 3 seconds. Vehicles need highly accurate and up to date maps to extend sensor range and "peek" around the corner.

Existing mapping services may use inaccurate estimates based on sets of data which are not designed to offer the precise measurements required. For example, centerline estimation may attempt a measurement of the width of a road and then just split it in two. For generalized routing, this may be adequate to offer a rough estimate of a distance from point A to point B. However, for assisted driving, errors of even a few centimeters may be hazardous.

Sensors in vehicles may be able to detect lanes and lane markings in real time using image processing and light detection and ranging (lidar) based systems. These systems are useful for obstacle avoidance and detecting the movements of other vehicles. When used alone though, on-board sensor systems may exhibit large blind spots and may be unable to predict events or maneuvers even a short distance away.

On-board sensors, however, when combined with high definition maps may allow for assisted and highly automated vehicle operation. High definition maps may allow a vehicle to identify precisely where it is with respect to the road (or the world) far beyond what the Global Positioning System can do, and without its errors. The map allows the vehicle to plan precisely where the vehicle may go, and to accurately execute that plan because the vehicle is following the map. By identifying precisely where a vehicle is on the road to the centimeter, and understanding the surroundings, a mapping system may bring advanced safety to an ever-changing environment.

SUMMARY

A method for lane identification. The method comprising a server receives positional data points from a vehicle. The server computes a continuous trajectory using the positional data points. The server receives an overhead image. The server crop and processes the image to remove any unwanted objects. The server identifies edge features in the image. The server uses the edge features and continuous trajectory to identify lanes.

An apparatus comprising at least one processor and at least one memory. Computer program code causes the apparatus to receive a path of a vehicle and an overhead image of the path. The apparatus crops the image and removes any unwanted objects. The apparatus identifies edge features. The apparatus identifies lanes using the path and the edge features.

A non-transitory computer readable medium comprising instructions to identify a lane. The instructions are operable to receive positional data and an overhead image. The instructions are operable to computer a continuous trajectory from the positional data. The instructions are operable to identify an edge feature in the overhead image. The instructions are operable to identify a lane using the edge feature and the continuous trajectory.

BRIEF DESCRIPTION OF THE DRAWINGS

Exemplary embodiments of the present invention are described herein with reference to the following drawings.

FIG. 7 illustrates an example image of an overhead image with lanes.

DETAILED DESCRIPTION

The following embodiments relate to using overhead images and global positioning system (GPS) information to efficiently locate and identify lanes in a roadway image. A trajectory of a vehicle derived from GPS is used to estimate road regions in the overhead image. Objects such as trees and vehicles are removed from the overhead image. Edge features are identified using a steerable filter (using the trajectory). Lanes are detected by finding the maximum of the sum of filter responses. Portions of the lanes which are covered or hidden in the overhead images are then estimated from the detected lanes.

Existing algorithms generally use satellite images for centerline estimation. Embodiments herein integrate GPS information and overhead images together to greatly improve the efficiency and accuracy of lane identification. Other systems use information captured from sensors onboard vehicles. Sensors may offer alerts when a car is moving too close to another object, but additional information from map coverage provides a more complete picture, eradicating sensor blind spots. A sensor may miss lane markings that are not clearly visible to the vehicle, lack the ability to identify if a car is in lane three or four of an eight lane highway, or not identify the matrix environment of an intersection with no lane markings. Additionally, these sensors and algorithms are generally used for real time navigation and only estimate lanes of roads at a certain distance in front of a vehicle. Embodiments herein generate and populate maps with lane-level accuracy for large regions such as cities and countries.

Certain embodiments may be configured to identify multiple lanes in the roadway. Existing systems may focus only on the driven lane. Further, certain embodiment are capable of handling inconsistent lane widths and merge/split situations where the markings deviate from a GPS trajectory.

Figure 1:
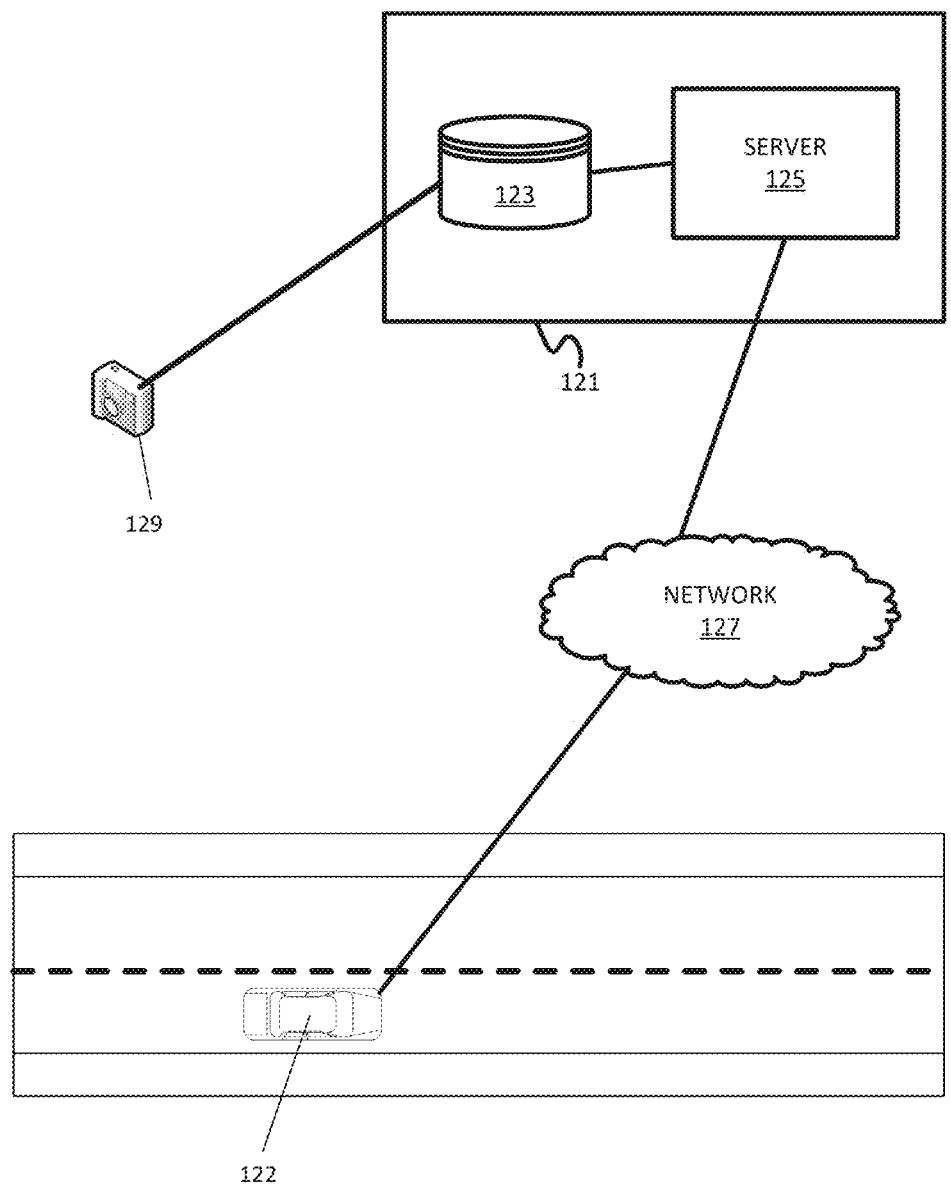
FIG. 1 illustrates an example of system for lane identification.

FIG. 1 illustrates an example of a system for lane identification. The system comprises one or more devices 122, a network 127, and a mapping system 121. The system may also include a device for capturing overhead imagery 129 such as an airplane or satellite. The mapping system 121 may include a server 125 and a database 123. The device 122 (here shown as a vehicle) may collect data including positional data. The device 122 transmits data through the network 127 to the mapping system 121 or the server 125. The database 123 may store the positional data, overhead image data received from the device for capturing aerial overhead imagery 129 and other related data.

The device 122 may be a mobile device or a tracking device that provides samples of data for the location of a vehicle. The device 122 may be a mobile phone running specialized applications that collect positional data as people travel roads as part of their daily lives. The device 122 may also be integrated in or with a vehicle. Switches, subsystems or sensors that are either standard or optional equipment on a vehicle may collect and aggregate information regarding the operation of the vehicle. The device 122 may be sensors located on the perimeter of the vehicle in order to detect the relative distance of the vehicle from lane or roadways, the presence of other vehicles, pedestrians, traffic lights, potholes and any other objects, or a combination thereof. The device 122 and/or other sensor(s) such as lidar or cameras may collect data from one or more vehicles and aggregate the data into positional data. The positional data may be transmitted over the network to the mapping system 121. The device 122 may also be configured to receive location and routing information from the mapping system 121. Such data may be used to navigation or operate a vehicle or device 122.

The mapping system 121 may include a database 123 and a server 125. The mapping system may be comprised of multiple servers, workstations, databases, and other machines connected together and maintained by a map developer. The mapping system 121 may be configured to provide up to date information and maps to external map databases or mapping applications. The mapping system 121 collects data from multiple sources, such as through the network 127, in order to maintain up to date roadway conditions. Data such as sensor data, weather, road conditions, traffic flow, and historical data is processed to determine current and future traffic conditions. The database 123 (also referred to as a traffic database or map database or geographic database) may include geographic data used for traffic and/or navigation-related applications. The geographic data may include overhead imagery of roads and other forms of transportation. The overhead images may be associated with other data representing a road network or system including road segment data and node data. For example, road segment data may be overlaid on overhead imagery. The road segment data represent roads. The node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

In certain embodiments high definition overhead images, such as aerial or satellite photography may be stored in the database 123. Aerial or satellite photography may be received from the device for capturing overhead imagery 129. Overhead imagery such as aerial or satellite photography may be collected from a third party responsible for operating the device for capturing overhead imagery 129. Overhead images collected or received from different sources may be combined to provide a continuous non-interrupted view of a region. Composite overhead images may updated as additional overhead images or information is collected.

The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

Figure 2:
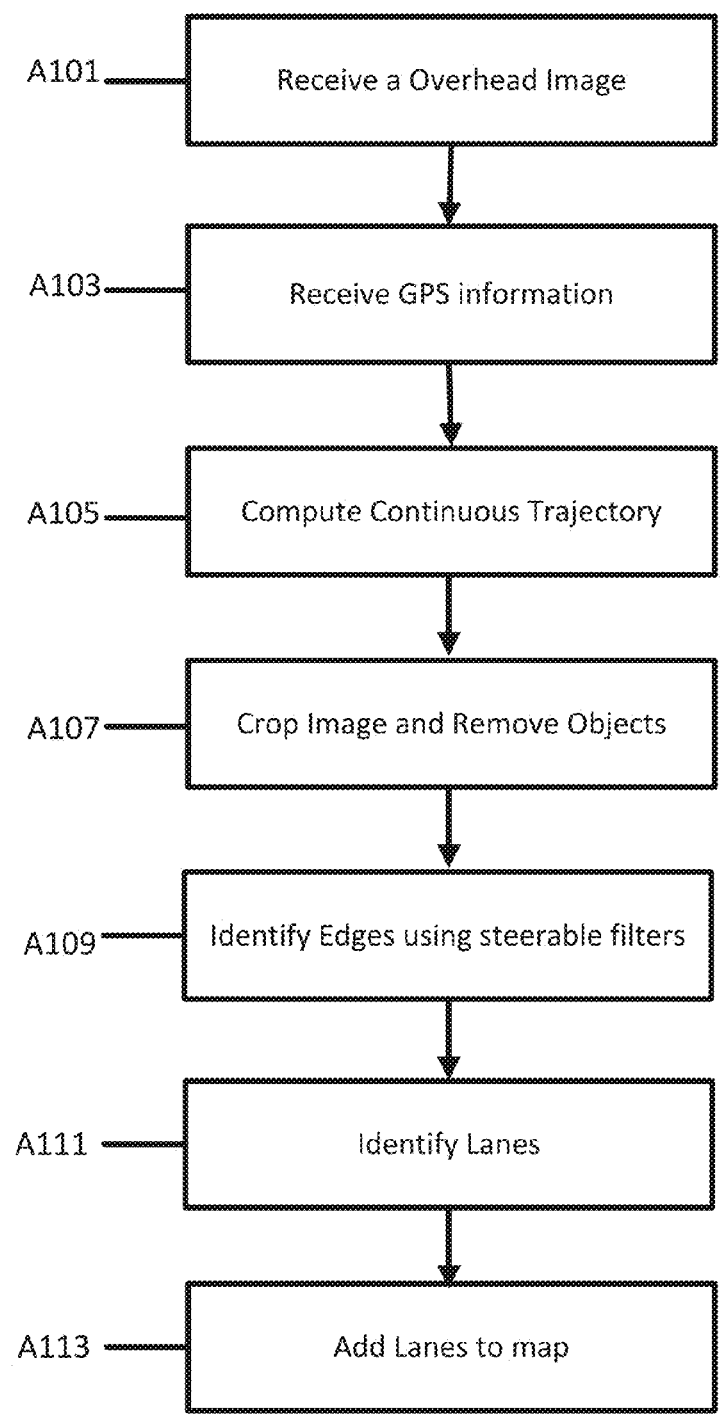
FIG. 2 illustrates a flow chart of lane identification

FIG. 2 illustrates a flow chart of a method for lane identification. As presented in the following sections, the acts may be performed using any combination of the components indicated in FIG. 1, FIG. 8, or FIG. 9. The following acts may be performed by the server 125, the device 122, the mapping system 121, or a combination thereof. Additional, different, or fewer acts may be provided. The acts are performed in the order shown or other orders. The acts may also be repeated. Certain acts may be skipped. For example, act A107 may be skipped depending on the content and size of the overhead image. Act A101 may be skipped or modified in that the database 123 may already contain high definition overhead images for the specified region.

At act A101 the server 125 receives an overhead image of one or more road sections. Overhead imagery is the process of taking photos of the ground from an elevated position such as from an airplane (aerial imagery). Aerial imagery may be collected using various methods including fixed-winged manned aircraft, balloons, kites, and a whole host of other methods. Another form of remotely capturing images taken of the earth's surface is known as satellite imagery (images taken from earth's orbit by satellites). Aerial and Satellite images may be captured with high resolution. In certain embodiments, the overhead images may be high definition. Satellite images may be combined with aerial images (including higher resolution images taken from airplane) to build composite images. Images may be georeferenced and stored alongside other georeferenced information in the database 123. Overhead imagery may be taken on demand of a region covering a section of roads. The database 123 may contain previously captured overhead images which may be updated as additional overhead images are received.

At act A103, the server 125 receives positional data measured from a device 122. The device (also referred to as a vehicle) 122 may be a mobile device or a tracking device that provides samples of data for the location of a vehicle. The device 122 may be part of a dedicated probe vehicle which travels the roadways collecting data in order to update the map database 123. Positional data may be collected at the device 122 by use of GPS receivers or Global Navigation Satellite System (GNSS) receivers. Positional data may also be collected from positional sensors in the device 122 or imbedded in the vehicle. Positional data may be derived from other data such as WIFI, lidar, or cellular signals. Positional data may be collected at regular intervals. Positional data may also be collected at a change in heading of the vehicle or device 122. Positional data may be supplemented with additional sensor data such as wireless or radar sensors in order to more accurately identify the position of the vehicle.

The positional data is collected at the device 122 and transmitted to the mapping system. The positional data may be transmitted as it is collected. The positional data may be stored locally in the device 122 and only transmitted once a threshold amount has been collected or transmission bandwidth is available.

The positional data may be received by the server 125 or the map database 123. The positional data may be received real time as the vehicle or device 122 travels along a roadway. In such a situation, the data may be identified as comprising a related set of data points. In certain embodiments, the data may be received as more than one data point. For example, data may be received once a day from the device 122 or only when bandwidth is available. Such data may include more than one trip covering the same road segment. Positional data may also be collected from more than one device 122 which may include overlapping trips covering the same road region or segment. Each set of data may be treated as a separate set of data or the data may be averaged together to create a single set. The mapping system may determine that positional data is overlapping if the data points are within a certain threshold of one another. For example, two vehicles driving in the same lane may not produce identical sets of data even though both vehicles are generally driving the same route. Related data points may be compared with one another to create an average or median value. Other algorithms may be used to combine sets of data. The sets of data may also be combined after the continuous trajectory has been calculated for each set as described below.

At act A105, the server 125 computes a continuous trajectory derived from the positional data. The server 125 links each of the positional data points (locations) together to create a continuous path. The first data point is connected to the second data point which is connected to the third data point and so on. The result of linking the data points is a rough estimation of a vehicle's path. The server 125 further computes normal directions for the continuous trajectories. For the locations at the end of each trajectory, the server 125 uses normal directions for the last line segments. For other locations in the middle, the server 125 uses the average of normal directions of two consecutive line segments. If the server 125 is missing a positional data point, the server 125 may derive the data from the existing path or historical data. The server 125 may combine more than one set of positional data to compute the trajectory. For example, the server 125 may use an algorithm (or the average or median) to combine the two or more sets of data. The server 125 may ignore or replace data that is outside a normal distribution of errors. For example, if a positional data point is outside the expected path in light of the other data points (such as when there is a gross GPS error), that data point may be disregarded or replaced.

At act A107, the server 125 segments or crops the overhead image and removes objects. The server 125 identifying the regions of the overhead image within a threshold distance of the continuous trajectory. The continuous trajectory computed in A105 may be overlaid on the overhead image. The overhead image and continuous trajectory may share positional coordinates which may be used to properly overlay the two. Once the two have been combined, the server 125 may crop the overhead image to generate an estimated road region. The server 125 roughly segments out road regions based on the vehicle GPS locations and the maximum road width. The goal of this step is to remove or crop other regions such as buildings and narrow down the search range of lanes. The maximum road width may be a value that is stored in the map database 123. For example, one of the attributes stored in the map database 123 may be road width. The maximum may also be calculated from alternative information stored in the map database 123. The map database 123 may indicate that a certain road segment is four lanes. The widths of vehicle lanes typically vary from 9 to 15 feet (in the United States for example). To be certain that everything is included, the maximum road width may be a multiple of the standard lane such as four times the width. The server 125 may segment (crop) out the regions outside the maximum road width (here using 9-15 feet as the typical width and a multiple of four—4 time 15 equals 60 feet) on each side of the positional data. The server 125 may also use an estimated center of the road to determine the road region. For example, using the lanes widths given above, the server 125 may only include the regions less than three time the maximum width (3 times 15 equal 45 feet) from the centerline. Different multiples and different maximum widths may be used to calculate the maximum road width. For different road segments, the database 123 may store the maximum road width. The server 125 may also use preexisting data regarding the buildings, sidewalks, or other identified features such as curbs to determine a road region. The following steps are applied to this estimated road regions in order to increase efficiency and limit noise.

The server may then remove objects that may interfere with the lane determinations or objects that may provide false positives when detecting features such as lines. Multiple methods may be use to remove unwanted objects.

Vehicles in the overhead image may generate false lane features. In certain embodiments the server 125 removes vehicles from the overhead images. There are many detection techniques could be applied in this process. The server 125 may use adaptive boosting (Adaboost) based object detection technique to detect vehicles. Adaboost is a machine learning meta-algorithm. Adaboost combines a set of weak classifiers to make a strong classifier. The server 125 may apply other techniques such as support vector machines (SVMs), other types of machine learning, perceptrons, and nearest neighbor, or other types of neural network systems to process the image. SVMs are algorithms that analyze data and recognize patterns, used for classification and regression analysis. Machine learning algorithms use existing identified objects to teach itself. After learning on existing objects, objects in images may be classified or detected. Once a vehicle is detected in the overhead images, the pixels that make up the vehicle may be identified (and removed) from the overhead image. The threshold for vehicle identification may be higher or lower depending on the type of road segment that was imaged. Different types of road segments may have varying volumes of vehicles in the overhead image at any time. Certain road segments may not need for vehicles to be removed depending on the type of road and time when the overhead image was taken. For example, lesser traveled roads such as rural or farm roads may have few to no vehicles present. Running the vehicle detection algorithms on the overhead image may return false positives or not return anything at all.

In addition to vehicles, other objects such as trees may cause issues during the later act of edge detection. Trees often have random textures that may generate multiple edge features. Hence, it may be beneficial to remove them from the overhead image. The server 125 may detect trees that have green (or a green shade) leaves. Hence, color based segmentation is applied that could be K-means and mean shift clustering algorithms. As with vehicle detection, multiple methods including one or more algorithms may be used to detect and then eliminate trees or foliage from the overhead image. For example, a pixel-level classifier may be trained to classify a {tree, non-tree} label to each pixel in the overhead image. The pixel-level classification is then refined by a partitioning algorithm to generate clean image masks of tree and non-tree regions.

Other objects, if they can be identified, may be isolated and removed from the overhead image. These steps may generate binary image masks for a road region that mainly contains road surfaces (e.g., '1' indicates vehicle or tree, '0' indicates road surface). The road surface mask may then be used to detect edge features.

In A109, the server 125 identifies edge features in the road region. The server 125 may use the road surface mask or what remains of the overhead image data once the road region has been identified and any extraneous objects have been removed. The server 125 may use edge detection to identify points in the overhead image at which the overhead image brightness changes sharply or has discontinuities. In certain embodiments, as only edges along the road tangent direction could be the lanes, the server 125 uses adaptive steerable filters to extract edge features. The angular portions or interpolation functions of these filters vary according to the road tangent directions. The radial portion of the filters could be fixed since the overhead images have fixed resolution and lane widths may be similar. The output of this step is a response map of these steerable filters.

One example of a steerable filter is the directional derivative of 2D Gaussian filter, $G_1^\varphi$, where subscript 1 indicates the first derivative (note that the second derivative also could be used) and superscript $\varphi$ is the orientation. $G_1^\varphi$ may be generated by a lienar combination of two basis filters, $G_1^0$ and $G_1^{\pi/2}$, which are filters along x and y direction respectively.

$$G_1^\varphi = \cos(\varphi) G_1^0 + \sin(\varphi) G_1^{\pi/2} \qquad \text{EQUATION \#1:}$$

The server 125 first computes road tangent direction for each node of GPS trajectory. The tangent directions of pixels in the overhead images are interpolated based on the distances to these nodes. Therefore, every pixel in the overhead image has a direction $\varphi_i$. $\varphi$ is a 2D array with the same size of the overhead image. $\cos(\varphi)$ and $\sin(\varphi)$ are the per-element operations, and multiplication in the above equation is also conducted per element.

$r=[G_1^\varphi]^2$ measures the orientation strength along the direction $\varphi$ (The server 125 may ignore the Hilbert transform of $G_1$, which may be used to measure the orientation strength). This may be referred to as the filter response. $r_i$ is the filter response for the i-th pixel.

Other methods for edge detection may be used such as canny edge detection, thresholding, edge thinning, image gradients, among others.

In act A111, the server 125 identifies lanes in the road region. Once the server 125 has computed the response map in A109, the server 125 may start the process to detect lanes. The server 125 translates the continuous trajectory along two normal directions. The server 125 then uses a maximization process for steps along the continuous trajectory. A step size along the normal direction could be as few as three to four pixels or as many as several hundred depending on the resolution of the image. At each step, the server 125 computes the sum of responses of these two translated continuous trajectories (i.e., $\Sigma r_i$ and $\Sigma r_i'$ where $r_i$ is the filter response for a pixel on the translated continuous trajectory).

If the distance between two translated trajectories is close to the distance between two lanes by a threshold, the lanes are detected by finding the maximum of the sum of filter responses. The real distance between two lanes could be measured in advance as the overhead image resolution is fixed. The server 125 continue this maximization process by further translating continuous trajectories along two normal directions. This iteration could detect multiple lanes within the road regions segmented in act A107.

Each maximization process could be summarized by the following equation:

$$\operatorname*{argmax}_{(C_t, C_{t'})} \left( \sum r_i + \sum r_i' \right) \qquad \text{EQUATION \#2}$$

subject to:

$$|t - t_{prev}| < d \text{ and } |t' - t_{prev}'| < d \qquad \text{EQUATION \#3}$$

where $r_i \in C_t$, $r_i' \in C_{t'}$, $C_t$ and $C_{t'}$ are the new trajectories translated from the GPS trajectory by t and t', $r_i$ and $r_i'$ are filter responses of ith pixel on $C_t$ and $C_{t'}$, $t_{prev}$ and $t_{prev}'$ are the previous estimated lanes during the maximization step, d is the threshold that is proportional to the lane width. In the first iteration, $t_{prev}$ and $t_{prev}'$ are the same.

In act A113, the identified lanes are overlaid on a map or the full overhead image. In some situations, the most road regions could be invisible (e.g., completely blocked by trees and vehicles). As a result, the lanes in these road regions cannot be estimated from an overhead image. The server 125 may connect end points of visible lanes based on the original continuous trajectory. For example, the server 125 may assume that over a short period that the driver is traveling parallel to a lane line. Using this assumption, the server 125 may extend identified lane lines through space that is unknown due to an obstruction.

The server 125 may also identify the type of lane from the overhead image. Different types of lanes may be identified from their markings or the lane layout. For example, a high occupancy vehicle or carpool lane may be marked with a diamond icon, or separated from other lanes by double broken white lines or a continuous pair of double yellow lines. Bike lanes may be identified by their width or markings on the pavement. A motorcycle lane may be identified by the markings on the pavement. A bus lane may be identified by the color or markings on the pavement. A parking lane is reserved for parallel parking of vehicles and may be identified by the orientation of the markings on the pavement. A shoulder, sometimes called an emergency lane or a breakdown lane, may be identified by its width or fill (gravel for example) or by markings such as rumble strips. Lane markings vary widely from country to country. In certain situations, yellow lines separate traffic going opposite directions and white separates lanes of traffic traveling the same direction. In certain embodiments, lane identification takes into consideration local customs and rules.

The detected lane data may be added to the map database and associated with the geographic data. These acts may be repeated for different road sections. The detected lanes may be compared against previously calculated lane data. Multiple passes over a roadway made be made over time in order to detect changes to the lane layout. On the ground data may also be used to update and improve lane detection.

The detected lanes may be transmitted to a navigation device 122 along with other map updates. The detected lanes may be used to determine a precise route for a vehicle from a starting point to a destination. The detected lanes may also be used for assisted or automated operation of a vehicle. The detected lanes may be used to identify shoulders and safe biking routes. The detected lanes may also be used to accurately identify or model turns or off-ramps. Accurate detected lanes may also serve as validation devices for on-board vehicle sensors.

FIGS. 3A, 3B, 4A, and 4B illustrate an example embodiment of lane identification.

Figure 3A:
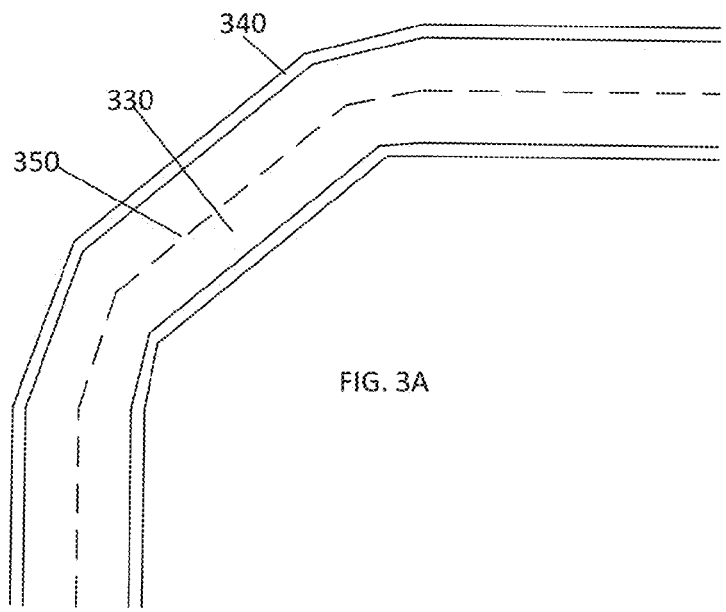
FIGS. 3A and 3B illustrate an example embodiment of lane identification.

FIG. 3A is a representation of an overhead image. The overhead image includes a roadway surface 330, shoulders 340 and a lane divider 350. In an actual overhead image, the lines including the roadway markings for the shoulder and lane may not be as clear. The overhead image may be comprised of pixels and may be in black and white or in color.

Figure 3B:
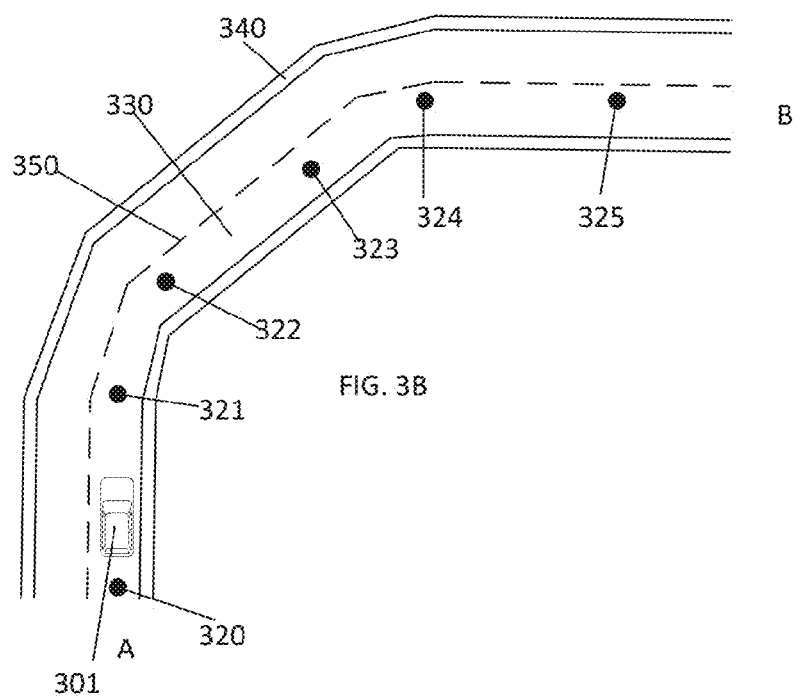

In FIG. 3B, a vehicle 301 travels along a roadway lane 330. At certain intervals, the vehicles collects positional data regarding the vehicle's path. These measurements are illustrated by the dots 320-325 as the vehicle moves from A to B. This positional data is transmitted to the server 125 though the network.

Figure 4A:
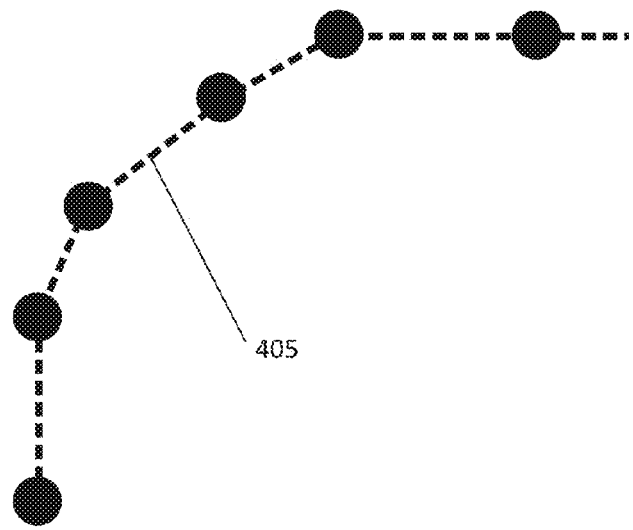
FIGS. 4A and 4B illustrate an example embodiment of lane identification.

In FIG. 4A, the positional data is linked by the server 125 to create a continuous trajectory 405 illustrated by the dotted line. The continuous trajectory is a representation of the path the vehicle took. The accuracy of the continuous trajectory 405 depends on the frequency that the positional data is collected. In certain embodiments, the server 125 may smooth out the continuous trajectory to more accurately represent the operation of a vehicle. For example, the intersection between the data points 320-325 are not smooth, but angular. Normal operation of a vehicle might take a smooth turn.

Figure 4B:
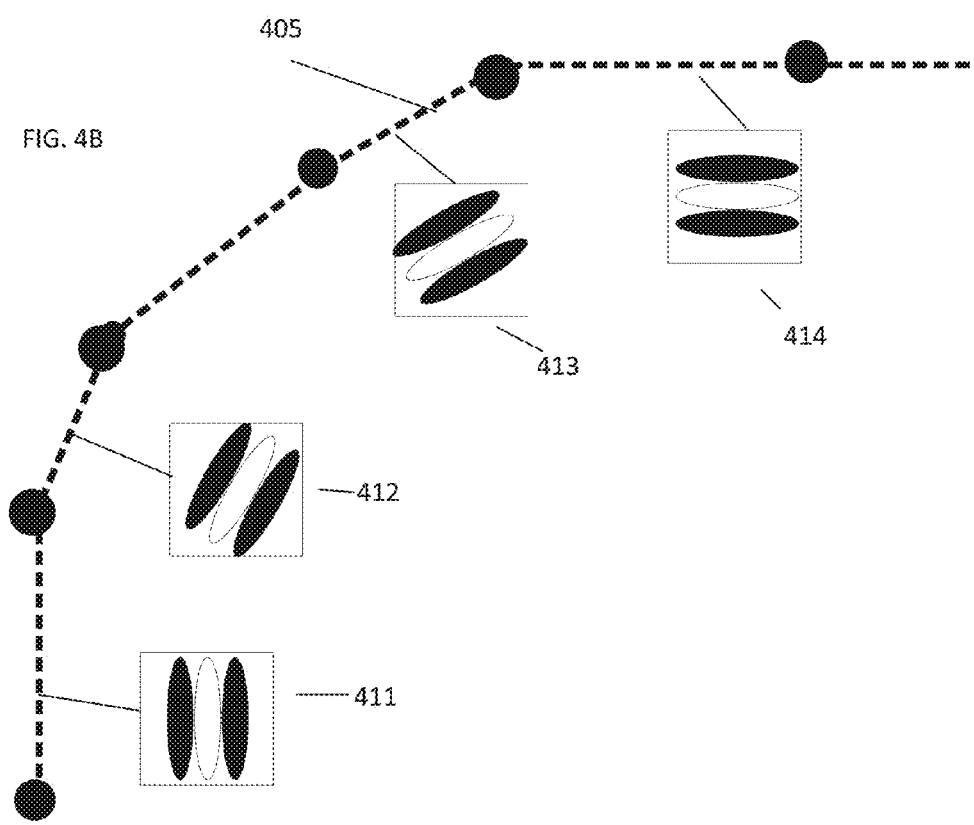

FIG. 4B shows adaptive steerable filters generated using the continuous trajectory. The filters 411-414 are oriented in line with the continuous trajectory. Oriented filers may be used in imaging processing tasks such as texture analysis, edge detection, and image enhancement. Using the adaptive steerable filters allows the server 125 to detect and identify the edges that may represent lanes (edges that are parallel with the continuous trajectory). Once the edges have been identified, the server 125 uses the edges and the trajectory to identify lanes in the roadway.

FIGS. 5A, 5B, 6A, and 6B illustrate image cropping, object detection and removal.

Figure 5A:
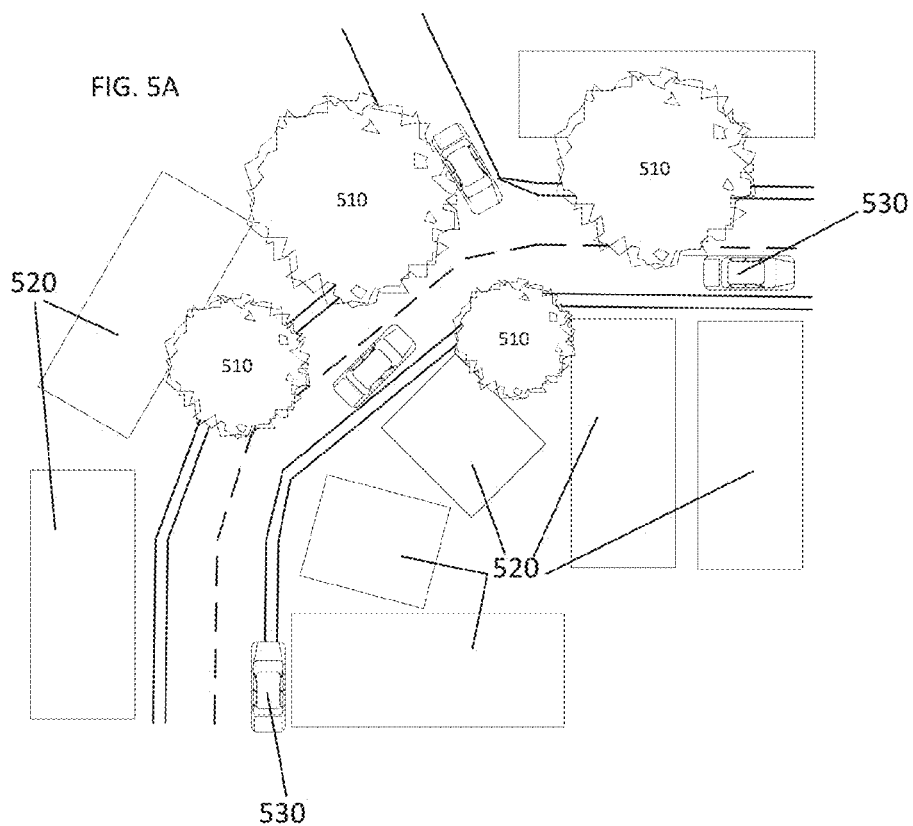
FIGS. 5A and 5B illustrate image cropping, object detection and removal.

FIG. 5A illustrates an overhead image of a roadway. The overhead image contain extraneous objects such as buildings 520, trees 510, and vehicles 530. These objects may cause errors or issues when the server 125 determines edges.

Figure 5B:
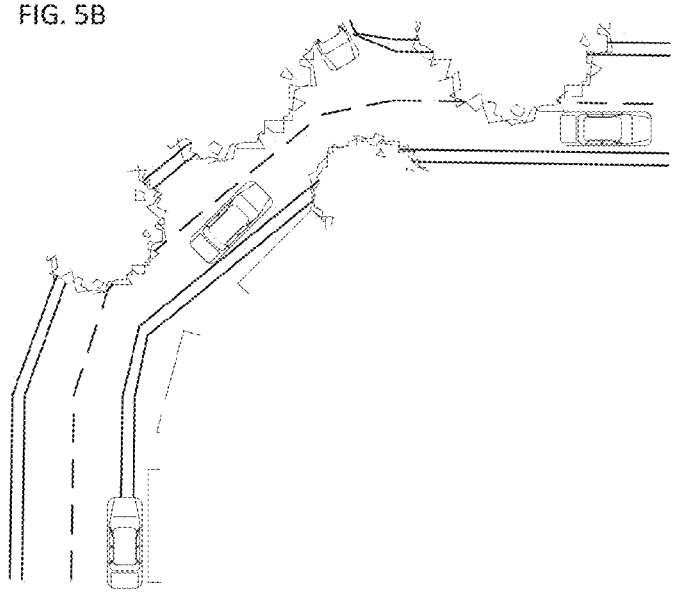

FIG. 5B illustrates the overhead image of 5A cropped down to only include a swath of area within a certain distance of the roadway. By cropping (or segmenting) the overhead image, the resulting overhead image is a more useable size. Information outside the roadway is not necessary to determine the lanes of the roadway.

Figure 6A:
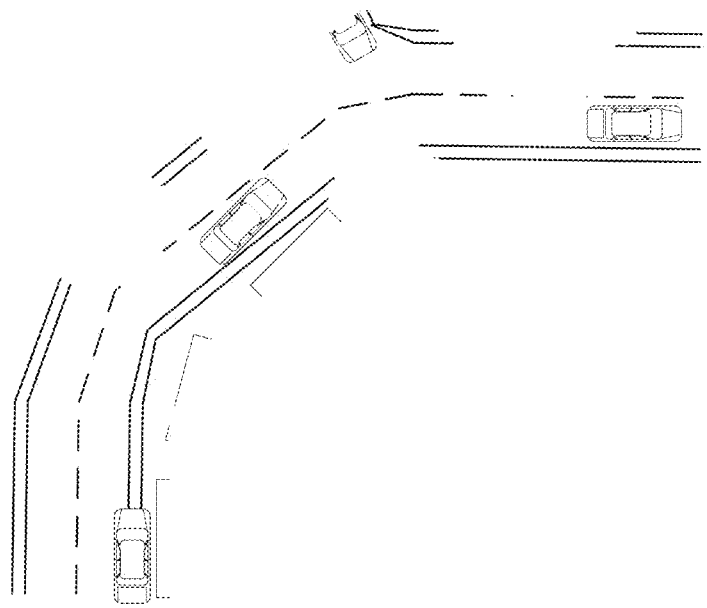
FIGS. 6A and 6B illustrate image cropping, object detection and removal.

FIG. 6A illustrates the overhead image of 5B after the trees have been removed. As illustrated in FIG. 5B, Trees often have random textures that may generate multiple edge features. In order not to produce multiple false positives for edges, it is beneficial to remove the pixels that make up the trees. The server 125 may detect trees that have green (or a green shade) leaves and removed those pixels (green pixels rarely indicating a lane). Other algorithms may be used to detect and then eliminate trees or foliage from the overhead image.

Figure 6B:
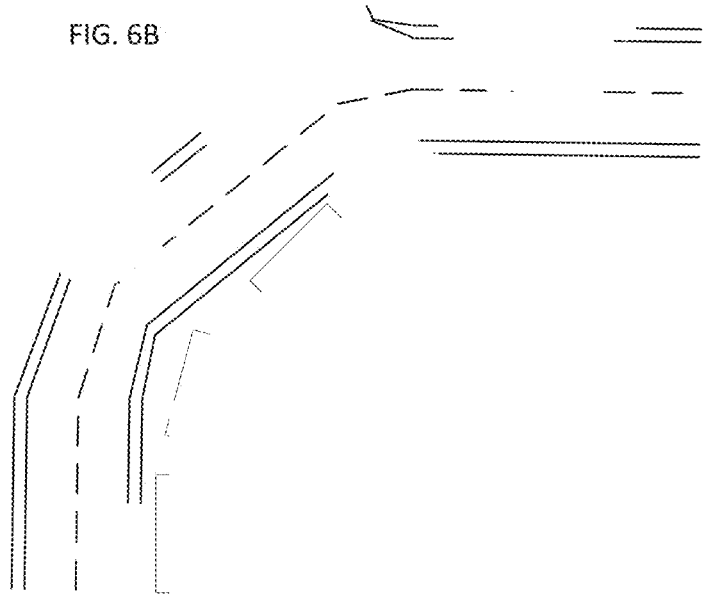

FIG. 6B illustrates the overhead image of 6A after the vehicles have been removed. Vehicles in the overhead image may generate a large amount of false lane features. In certain embodiments the server 125 removes vehicles from the overhead images using object detection techniques such as Adaboost or SVM. The server may learn a vehicle model and attempt to classify pixels in the image as vehicles or non-vehicles. A database is built from existing images of vehicles, which the server is then trained on.

The overhead image illustrated in FIG. 6B may be the overhead image data that is used to determine the edge features and subsequently lanes. Buildings, trees, and vehicle pixels have been removed from the overhead image. Edges may be detected in the overhead image using a steerable filter. Certain edges may then be identified as lanes.

FIG. 7 illustrates an example overhead image 700 of an overhead image with lanes. The lanes 710 have been determined using the process above. However, large sections of the roadway are blocked by trees. This section may be estimated using the existing lanes 710 and the trajectory 715 to produce estimated lanes 705.

Figure 8:
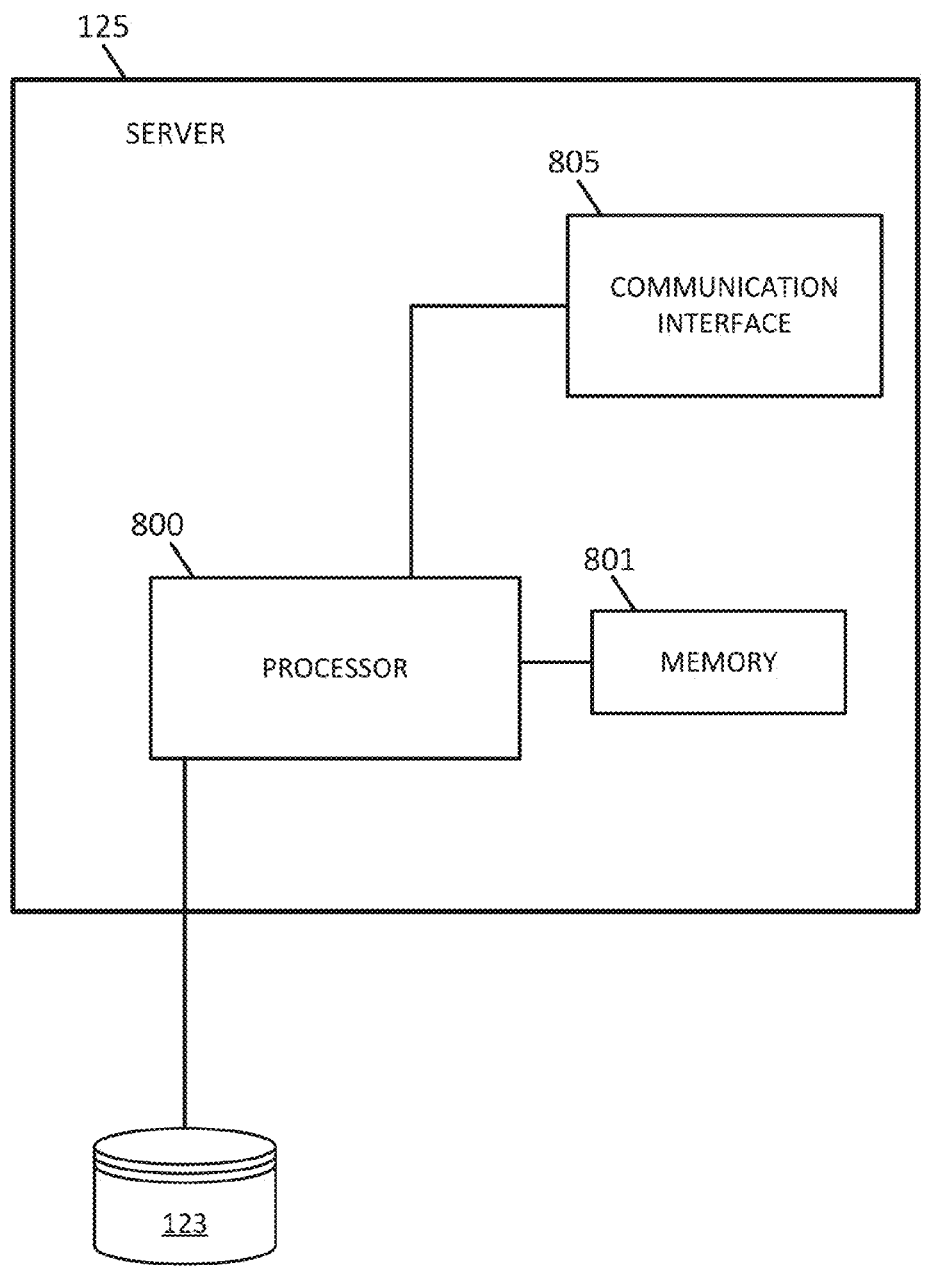
FIG. 8 illustrates an example server of FIG. 1.

FIG. 8 illustrates an example server 125 of FIG. 1. The server 125 includes a processor 800, a communication interface 805, and a memory 801. The server 125 may be coupled to a database 123. Additional, different, or fewer components may be provided in the server 125. The server 125 may be a host for a website or web service such as a mapping service and/or a navigation service. The mapping service may provide maps generated from the geographic data of the database 123, and the navigation service may generate routing or other directions from the geographic data of the database 123.

The term server is used herein to collectively include the computing devices for creating, maintaining, indexing, and updating the one or more databases 123 and indexes. Any computing device may be substituted for the device 122. The computing device may be a host for a website or web service such as a mapping service or a navigation service. The mapping service may provide maps generated from the geographic data of the database 123, and the navigation service may calculate routing or other directions from the geographic data of the databases 123.

The server 125 or processor 800 may be configured to detect lanes in an overhead image. The overhead image may be stored in memory 801 or the database 123. The overhead image may be received through the communication interface. The overhead image may be received from a device for overhead images. Positional data may be received from the device through the network 127. The server 125 or processor 300 may be configured to process the overhead image and the positional data to determine lanes.

The controller 200 and/or processor 800 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network 127, distributed processing, or cloud computing.

The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 805 provides for wireless and/or wired communications in any now known or later developed format.

In addition to the data describe above, the map database 123 may include node data records, road segment or link data records, Point of Interest (POI) data records, and other data records. More, fewer or different data records may be provided. In one embodiment, the other data records include cartographic data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or Global Positioning System (GPS) data associations (such as using known or future map matching or geo-coding techniques).

The road segment data records are links or segments representing roads, streets, or paths, which may be used for determination of one or more routes. The node data records are points corresponding to the respective links or segments of the road segment data records. The road link data records and the node data records represent a road network, such as used by vehicles, cars, and/or other entities. Alternatively, for example, the map database 123 may contain path segment and node data records or other data that represent pedestrian paths or areas in addition to or instead of the vehicle road record data.

The road or link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The map database 123 may include data about the POIs and their respective locations in the POI data records. The map database 123 may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the map database 123 may include historical and current event data (e.g., traffic incidents, constructions, scheduled events, unscheduled events, etc.) associated with the POI data records or other records of the database 123.

The database 123 may be maintained by a content provider (e.g., a map developer). By way of example, the map developer may collect vehicle, roadway, and traffic data to generate and enhance the database 123. Data may be obtained from multiple sources, such as municipalities or respective geographic authorities. In addition, the map developer may employ field personnel to travel by vehicle along roads throughout the geographic region to observe features and/or record information about them, positional data for example. Also, remote sensing, such as aerial or satellite photography, may be used. The database 123 may integrate data collected from device or sensors. The database 123 may store information derived from the collected information such as lane boundaries, curbs, or other identifiable road features.

Figure 9:
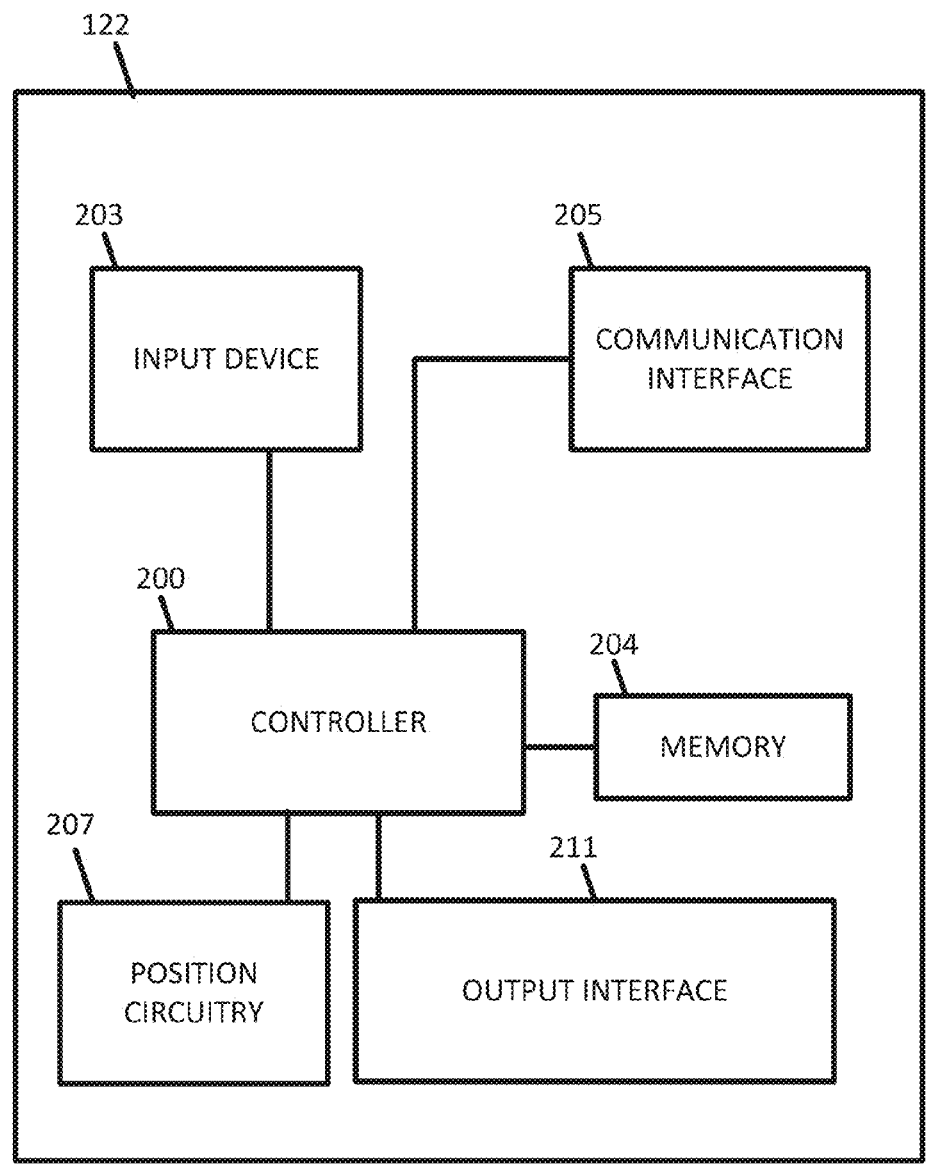
FIG. 9 illustrates an example device of FIG. 1.

FIG. 9 illustrates a device configured to collect and transmit positional data. The device 122 may be referred to as a navigation device or a vehicle. The device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the device 122. The device 122 is a smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device, or the device may be integrated into a vehicle.

The positioning circuitry 207, which is an example of a positioning system, is configured to determine a geographic position of the mobile device 122. The positioning circuitry may include a GPS receiver or a GNSS receiver. The movement circuitry 208, which is an example a movement tracking system, is configured to determine movement of a mobile device 122. The position circuitry 207 and the movement circuitry 208 may be separate systems, or segments of the same positioning or movement circuitry system. The movement circuitry 208 may include a gyroscope, an accelerometer, or an inertial measurement unit. In an embodiment, components as described herein with respect to the mobile device 122 may be implemented as a static device.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

Lane information may be used to directly or indirectly navigation a vehicle. The navigation device 122 may be integrated into an autonomous vehicle or a highly assisted driving (HAD) vehicle. The navigation device 122 may be configured as a navigation system for an autonomous vehicle or a HAD. An autonomous vehicle or HAD may undertake maneuvers in response to lane information determined by the server 125.

As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (lidar), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

Lane information is included in HD maps which allow highly automated vehicles to precisely locate themselves on the road and they also serve as a foundation for real-time data about the road environment. A HAD vehicle needs to know where it is on the road with respect to the lanes, and thus where the lanes are. It needs to plot a course to stay properly in the lane, and needs to plot courses to move to other lanes and roads. It is also beneficial for a vehicle to know the geometry of where that it is turning to, how many lanes are there on the next road, what is beyond the truck that is blocking a view, etc. Lane information from a HD map may also validate information detected real time at the vehicle using sensors such as radar, lidar, and cameras.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving two or more positional data points from a vehicle;
computing, by a processor, a continuous trajectory of the vehicle using the two or more positional data points;
receiving an overhead image of a road section including the two or more positional data points, the overhead image comprising the road section and one or more objects covering the road section;
cropping, by the processor, the overhead image to a road region image;
detecting, by the processor, the one or more objects covering the road section in the road region image cropped from the overhead image;
removing, by the processor, the one or more objects covering the road section from the road region image;
identifying, by the processor, an edge feature in the road region image with the one or more objects removed using at least one filter and the continuous trajectory;
identifying, by the processor, a lane in the road region image using the continuous trajectory and the edge feature; and
estimating, by the processor, a covered lane using the identified lane and the continuous trajectory, the covered lane being covered by the one or more objects in the road region image cropped from the overhead image.

2. The method of claim 1, wherein the edge feature is identified using steerable filters aligned with the continuous trajectory.

3. The method of claim 1, wherein the two or more positional data points are global positioning system data.

4. The method of claim 1, wherein the overhead image is a satellite image.

5. The method of claim 1, wherein the one or more objects include at least one tree and removing comprises:
identifying a color of a pixel in the road region image; and
if the pixel is green, removing the pixel from the road region image.

6. The method of claim 1, wherein the one or more objects include at least one vehicle and the at least one vehicle is detected in the road region image by using a machine learning algorithm.

7. The method of claim 1, wherein cropping the overhead image comprises:
determining, by the processor, a distance from the continuous trajectory; and
cropping, by the processor, the overhead image to include a portion within the distance from the continuous trajectory.

8. The method of claim 1, wherein identifying lanes comprises:
computing, by the processor, a maximum filter response of the edge feature within a threshold of the continuous trajectory.

9. The method of claim 1, further comprising:
computing, by the processor, a route from a starting point to a destination using an identified lane.

10. The method of claim 1, further comprising:
identifying, by the processor, a second lane in the road region image using the continuous trajectory and the edge feature; and
identifying, by the processor, a third lane in the road region image using the continuous trajectory and the edge feature.

11. An apparatus comprising:
at least one processor; and
at least one memory including computer program code for one or more programs; the at least one memory configured to store the computer program code configured to, with the at least one processor, cause the apparatus to at least perform:
receiving a path of a vehicle;
receiving an overhead image of the path;
cropping the overhead image to a road region image;
detecting one or more objects covering a road section in the road region image cropped from the overhead image;
removing the one or more objects covering the road section from the road region image;
identifying an edge feature in the road region image without the one or more objects using at least one filter and the path;
identifying a lane in the road region image using the path and the edge feature; and
estimating a covered lane using the identified lane and the path, the covered lane in the road section covered by the one or more objects in the road region image cropped from the overhead image.

12. The apparatus of claim 11, wherein the edge feature is identified using steerable filters aligned with the path.

13. The apparatus of claim 11, wherein cropping the overhead image comprises:
determining a distance from the path; and
cropping the overhead image to include the portion within the distance from the path.

14. The apparatus of claim 11, wherein the at least one memory and computer program code are configured to cause the apparatus to further perform:
computing a route from a starting point to a destination using the identified lanes.

15. The apparatus of claim 11, wherein identifying lanes comprises:
computing a maximum filter response of the edge feature within a threshold of the path.

16. A non-transitory computer readable medium comprising instructions that when executed are operable to:
receive two or more positional data points from a vehicle;
compute a continuous trajectory of the vehicle using the two or more positional data points;
receive an overhead image of one or more road sections traveled by the moving vehicle, the overhead image comprising the one or more road sections and one or more objects covering the one or more road sections;
remove the one or more objects covering the one or more road sections from the overhead image;
identify an edge feature in the overhead image without the one or more objects using steerable filters and the continuous trajectory, the steerable filters oriented in line with the continuous trajectory;

identify a lane in the overhead image using the continuous trajectory and the edge feature; and estimate a covered lane using the identified lane and the continuous trajectory, the covered lane located in the one or more road sections covered by the one or more objects in the overhead image.

17. The non-transitory computer readable medium of claim 16, wherein identifying lanes comprises:

computing a maximum filter response of the edge feature within a threshold of the continuous trajectory.

18. The non-transitory computer readable medium of claim 16, wherein the non-transitory computer readable medium comprising instructions that when executed are further operable to:

computing a route from a starting point to a destination using an identified lane.

* * * * *